(12) United States Patent
Pesach

(10) Patent No.: US 9,400,177 B2
(45) Date of Patent: *Jul. 26, 2016

(54) PATTERN PROJECTOR

(71) Applicant: Apple Inc., Cupertino, CA (US)

(72) Inventor: Benny Pesach, Rosh Ha'ayin (IL)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,432

(22) Filed: Apr. 19, 2015

(65) Prior Publication Data

US 2015/0226545 A1    Aug. 13, 2015

Related U.S. Application Data

(62) Division of application No. 13/204,719, filed on Aug. 8, 2011, now Pat. No. 9,036,158.

(60) Provisional application No. 61/372,469, filed on Aug. 11, 2010.

(51) Int. Cl.
*G01B 11/25* (2006.01)
*G02B 6/34* (2006.01)
*G01S 17/74* (2006.01)
*G02B 5/18* (2006.01)

(52) U.S. Cl.
CPC ............. *G01B 11/254* (2013.01); *G01S 17/74* (2013.01); *G02B 5/1842* (2013.01); *G02B 6/34* (2013.01)

(58) Field of Classification Search
None
See application file for complete search history.

(56) References Cited

U.S. PATENT DOCUMENTS

| | | | | |
|---|---|---|---|---|
| 6,236,773 | B1 * | 5/2001 | Butler | G02B 6/12004 385/14 |
| 7,123,794 | B2 * | 10/2006 | Greiner | G02B 6/12007 385/129 |
| 9,036,158 | B2 * | 5/2015 | Pesach | G01S 17/74 356/603 |
| 2008/0106746 | A1 * | 5/2008 | Shpunt | G01B 11/2513 356/610 |
| 2010/0008588 | A1 * | 1/2010 | Feldkhun | G01B 11/2518 382/206 |

* cited by examiner

Primary Examiner — Jennifer L. Doak
Assistant Examiner — James McGee
(74) Attorney, Agent, or Firm — D. Kligler IP Services Ltd.

(57) ABSTRACT

A pattern projector, comprising a light source, configured to emit a beam of light. A transparent substrate, which has a pair of mutually-opposed planar surfaces is configured to receive and propagate the beam within the substrate by total internal reflection between the planar surfaces. The transparent substrate comprises a diffractive structure that is formed on one of the planar surfaces and is configured to direct at least a part of the beam to propagate out of the substrate in a direction that is angled away from the surface and to create a pattern comprising multiple interleaved light and dark areas.

12 Claims, 4 Drawing Sheets

PATTERN PROJECTOR

CROSS-REFERENCE TO RELATED APPLICATION

This application is a division of U.S. patent application Ser. No. 13/204,719, filed Aug. 8, 2011, which claims the benefit of U.S. Provisional Patent Application 61/372,469, filed Aug. 11, 2010, which is incorporated herein by reference.

FIELD OF THE INVENTION

The present invention relates generally to optical systems, and specifically to pattern projectors.

BACKGROUND OF THE INVENTION

Optical systems are used for a wide range of applications, such as spectroscopy, transmission of data modulated on light beams and image projection. Optical systems use various optical elements, including mirrors, prisms, lenses and diffractive structures.

A paper titled: "Total internal reflection diffraction grating in conical mounting", by L. Eisen et. al., Optical Communications 261, pages 13-18 (2006), the disclosure of which is incorporated herein by reference in its entirety, discusses investigations of surface relief diffraction gratings that involve total internal reflection (TIR) in the substrate on which the gratings are recorded.

US patent application publication 2011/0019258 to Levola describes use of various optical elements in leading illumination light for a liquid crystal on silicon (LCOS) microdisplay.

A recently emerging application of optical systems is three dimensional (3D) mapping of objects. Such mapping is used in computer vision, automation and optical image processing.

A paper titled: "Three-dimensional mapping and range measurement by means of projected speckle patterns", by Garcia et al., published May 26, 2008, in Applied Optics, Vol. 47, No. 16, pages 3032-3040, the disclosure of which is incorporated herein by reference in its entirety, describes various methods used for performing 3D mapping and various light sources which may be used, including sources of both conventional illumination and coherent illumination.

The paper "Projection of speckle patterns for 3D sensing", by Garcia et el., Journal of Physics, Conference series 139 (2008), the disclosure of which is incorporated herein by reference in its entirety, suggests using a monochromatic parallel beam of laser light.

US patent application publication 2008/0240502 to Freedman et al., the disclosure of which is incorporated herein by reference in its entirety, suggests using a coherent point source with large angular divergence, such as a laser diode, with or without collimation optics.

SUMMARY

Embodiments of the present invention that are described hereinbelow provide systems for pattern projection.

There is therefore provided in accordance with an embodiment of the present invention a pattern projector, comprising a light source, which is configured to emit a beam of light; and a transparent substrate, which has a pair of mutually-opposed planar surfaces and is configured to receive and propagate the beam within the substrate by total internal reflection between the planar surfaces and which comprises a diffractive structure that is formed on one of the planar surfaces and is configured to direct at least a part of the beam to propagate out of the substrate in a direction that is angled away from the surface and to create a pattern comprising multiple interleaved light and dark areas.

Optionally, the diffractive structure comprises both diffractive sub-areas and non-diffractive sub-areas arranged to define a projected pattern in the light beam exiting the substrate.

Optionally, a projection lens which directs the light beam exiting the substrate toward a target. Optionally, the pattern comprises a quasi-random distribution of light spots. Optionally, the diffractive structure on one of the planar surfaces creates a diffraction pattern comprising multiple interleaved light and dark areas in far-field.

Optionally, light exiting the substrate through the diffractive structure is projected directly onto a target without passing through additional optical elements.

Optionally, the projector at least one diffractive element through which light exiting the substrate through the diffractive structure passes on its way to the object.

Optionally, the transparent substrate is arranged to receive the light beam from an edge transverse to its longest dimension. Optionally, the projector includes a coupling lens adapted to deflect the light beam on its entrance into the substrate, so that the light enters the substrate at an angle suitable for the total internal reflection.

Optionally, the projector includes a carrier on which the light source and the substrate are mounted in an arrangement such that distortion of the carrier due to temperature changes compensates for distortions of the coupling lens due to temperature changes. Optionally, the light beam from the light source is directed into the substrate without passing through a coupling lens.

There is further provided in accordance with an embodiment of the present invention a method of pattern projection, comprising directing a light beam into a transparent substrate, propagating the light beam through the substrate by total internal reflection to a diffractive structure on the substrate, and emitting a light beam that projects a pattern comprising multiple interleaved light and dark areas through the diffractive structure.

Optionally, emitting the light beam comprises emitting through a diffractive structure which defines a pattern comprising multiple interleaved light and dark areas in a far-field. Optionally, emitting the light beam comprises emitting through a diffractive structure including diffractive areas and plain areas.

There is further provided in accordance with an embodiment of the present invention a three dimensional mapping system, comprising a light source which generates a light beam for illuminating an object, transparent substrate defining a diffractive structure thereon, the transparent substrate being configured to receive the light beam from the light source, and to direct the light beam within the substrate, by total internal reflection, to the diffractive structure from which the light beam is directed to the object, a light detection unit configured to collect light from the light source reflected from the object; and a processor configured to process light collected by the light detector for three-dimensional mapping of the object, responsive to patterns of the light projected on the object from the diffractive structure.

Optionally, the transparent substrate is arranged to receive the light beam through one of its greatest area surfaces.

Optionally, the system includes at least one mirror which directs the light beam from the source to the transparent substrate.

Optionally, an edge of the transparent substrate is treated to prevent reflection of light received from the diffractive structure from returning to the diffractive structure. Optionally, the diffractive structure comprises both diffractive sub-areas and non-diffractive sub-areas arranged to define an image in the light beam exiting the substrate through the diffractive structure. Optionally, the diffractive structure is designed to project a quasi-random distribution of light spots. Optionally, the system includes a diffractive element through which the light emitted from the diffractive structure defined on the transparent substrate passes on its way to the object.

Optionally, the light beam emitted from the diffractive structure defined on the transparent substrate is substantially uniform and the diffractive element is configured to diffract the light beam to create a pattern comprising multiple interleaved light and dark areas.

There is further provided in accordance with an embodiment of the present invention a pattern projector, comprising a light source, an object surface having a hemispherical or quasi-hemispherical shape, arranged to receive light from the light source, a projection lens having a hemispherical or quasi-hemispherical shape, arranged such that its center substantially coincides with the center of the object surface, configured to direct light from the object surface toward a desired direction.

Optionally, the projection lens and the object surface have a same radius. Optionally, the projection lens and object surface are separated by an opaque surface having a central aperture defined therein.

There is further provided in accordance with an embodiment of the present invention a method of three dimensional mapping, comprising directing a light beam into a transparent substrate, so that the light beam propagates through the substrate by total internal reflection to a diffractive structure on the substrate; directing light exiting the transparent substrate from the diffractive structure towards an object; collecting light reflected from the object; and determining a three dimensional mapping of the object responsive to the collected light.

Optionally, the diffractive structure comprises a quasi-random distribution of light spots. Optionally, the diffractive structure comprises both diffractive sub-areas and non-diffractive sub-areas arranged to define an image in the light beam exiting the substrate.

Optionally, directing a light beam into a transparent substrate comprises directing the light beam through one or more mirrors from a light source to the substrate.

The present invention will be more fully understood from the following detailed description of the embodiments thereof, taken together with the drawings in which:

DETAILED DESCRIPTION OF EMBODIMENTS

Figure 1:
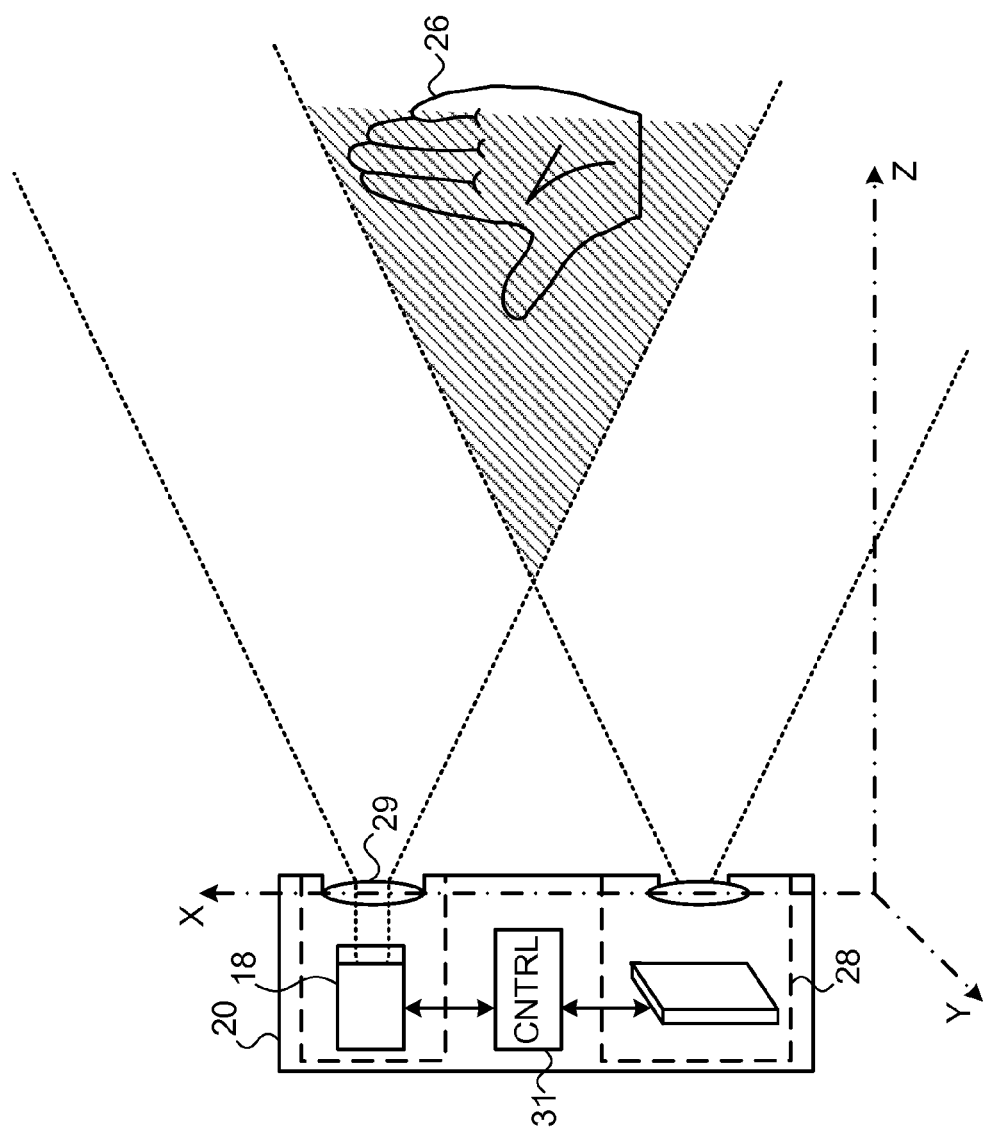
FIG. 1 is a schematic, pictorial illustration of a system for 3D optical mapping, in accordance with an embodiment of the present invention.

An aspect of some embodiments of the invention relates to generating a pattern projection light beam using an optical path including a transparent plate through which the light beam passes by total internal reflection (TIR). An exit area of the light beam from the transparent plate comprises one or more diffractive structures designed to project a pattern comprising multiple interleaved light and dark areas.

In some embodiments of the invention, the exit area includes a diffractive structure which projects a light beam with a far-field diffraction pattern, such as a random or a quasi-random distribution of light spots.

In other embodiments of the invention, the exit area includes a plurality of local diffractive structures separated by flat areas. Light exits the transparent plate through the local diffractive structures, such that a pattern comprising multiple interleaved light and dark areas is projected from the exit area. A projection lens projects the pattern to the far-field. Portions of the light beam corresponding to dark areas of the pattern are reflected back into the plate by total internal reflection, such that their energy is not lost and thus, the energy utilization of the light beam generation is substantially lower than if an absorbing plate is used to generate the pattern.

An aspect of some embodiments of the invention relates to passing a light beam used in optical three-dimensional (3D) mapping through a transparent plate by total internal reflection (TIR) on its way to a mapped object. The light beam is released from the transparent plate through a diffractive structure. One advantage of the use of such a transparent plate is that it allows for elimination of the zero-order beam component, which can cause eye hazard when the mapped object is a human. This is because zero-order light components are not released from the transparent plate by the diffractive structure, but are rather returned by total internal reflection.

In some embodiments of the invention, the diffractive structure on the transparent plate is designed to both release the light beam from the transparent plate and to project a pattern comprising multiple interleaved light and dark areas in the far-field. Alternatively, the diffractive structure on the transparent plate is a relatively simple structure which only releases the light beam from the transparent plate and the released beam is directed through one or more additional diffractive elements, possibly through an element having diffractive structures on both sides, in order to form the far-field pattern.

An aspect of some embodiments of the invention relates to generating a light beam having a given pattern by passing a light beam through an object surface having a spherical or quasi-spherical shape and through a spherical projection lens, having a sphere center substantially coinciding with a sphere center of the spherical object surface.

Although certain embodiments are described herein in the context of pattern projection for 3D mapping, some of the embodiments described herein may be used for other purposes requiring projection of patterned light.

System Background

FIG. 1 is a schematic, pictorial illustration of a system 20 for 3D optical mapping, in accordance with an embodiment of the present invention. System 20 comprises a pattern projector 18 which generates and projects a pattern light beam through an aperture 29 at an object 26 (in this case a hand of a user of the system) and a light detection unit 28, which collects light reflected from object 26.

A controller 31, implemented, for example, on one or more processors, processes image data generated by light detection unit 28 in order to reconstruct a 3D map of object 26. The term "3D map" refers to a set of 3D coordinates representing the surface of the object. The derivation of such a map based on image data is referred to herein as "3D mapping" or equivalently, "3D reconstruction." Controller 31 computes the 3D coordinates of points on the surface of object 26 by triangulation, based on the transverse shifts of spots in an image of the pattern that is projected onto the object relative to a reference pattern at a known distance from system 20. The triangulation-based 3D mapping is optionally performed as described in PCT publication WO 2007/043036, titled: "Method and System for Object Reconstruction", and/or in PCT publication WO 2007/105205, titled: "Three Dimensional Sensing using Speckle Patterns", which are incorporated herein by reference. These methods may be implemented using projected patterns of various sorts, as described, for example, in US patent publication 2008/0240502. Other mapping methods known in the art may also be used.

Furthermore, system 20 in accordance with some embodiments may be produced as a very compact unit, for example being included in a mobile station (e.g., PDA, cellular phone) and/or a portable computer.

The 3D map that is generated by controller 31 may be used for a wide range of different purposes. For example, the map may be sent to an output device, such as a display (not shown), which shows a pseudo-3D image of the object. In the example shown in FIG. 1, object 26 comprises all or a part (such as a hand) of the body of a subject. In this case, system 20 may be used to provide a gesture-based user interface, in which user movements detected by means of system control an interactive computer application, such as a game, in place of tactile interface elements such as a mouse, joystick or other accessory. Alternatively, system 20 may be used to create 3D maps of objects of other types, for substantially any application in which 3D coordinate profiles are needed.

Figure 2:
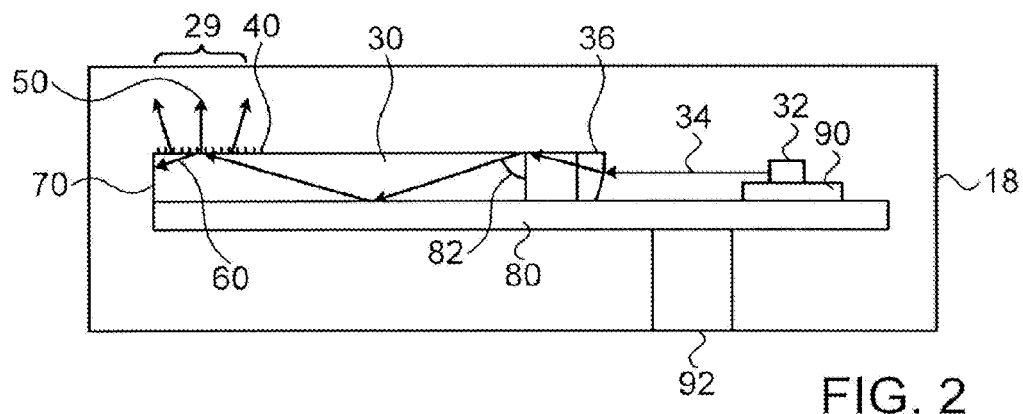
FIG. 2 is a schematic diagram of the elements of a pattern projector, in accordance with an embodiment of the invention.

FIG. 2 is a schematic diagram of the elements of pattern projector 18, in accordance with an embodiment of the invention. Pattern projector 18 comprises a light source 32 which generates a light beam 34 to be directed to object 26 (FIG. 1). The term "light" is used broadly in the present patent application and in the claims to refer to any sort of optical radiation, including not only visible light, but also infrared or ultraviolet radiation.

In accordance with embodiments of the present invention, light beam 34 passes through a transparent substrate 30 on its way from light source 32 to a surface-relief diffractive structure 40 formed on the surface of the substrate. Optionally, a coupling lens 36 is placed on one edge of substrate 30, so as to collimate and couple light beam 34 into transparent substrate 30, such that the collimated light beam is guided within substrate 30 by total internal reflection (TIR). Coupling lens 36 is optionally designed to direct light beam 34 towards the walls of substrate 30 at an incidence angle 82 greater than arcsin(1/n), where n is the substrate refractive index relative to its surroundings.

A section of a surface of substrate 30 is provided with a surface-relief diffractive structure 40, including transparent ridges. At least some of the light beam 34 reaching diffractive structure 40, hits the ridges at an angle lower than the TIR angle, exits substrate 30 and is directed through aperture 29 toward object 26. Interference between beamlets of the light exiting the grating causes the light to form a diffraction pattern, comprising multiple interleaved light and dark areas in the far field on object 26.

The length of substrate 30 is optionally selected such that the majority of light beam 34 reaches diffractive structure 40 at an angle that causes the light to be emitted with a desired angular distribution 50, while allowing an undiffracted light portion 60 of beam 34 to continue to be guided within substrate 30.

In some embodiments, an edge 70 of substrate 30 opposite coupling lens 36, is treated such that it does not back-reflect undiffracted light portion 60 incident thereon. This treatment avoids creation of a ghost image in the light exiting pattern projector 18. The treatment optionally includes an absorptive coating and/or an anti-reflective coating.

System Details

Various types of light sources may be used as light source 32 including, for example, a single mode or multimode laser. In some embodiments of the invention, light source 32 comprises a distributed feedback (DFB) laser.

Substrate 30 optionally comprises a plastic, such as Zionex, Polymethyl methacrylate (PMMA) and Polycarbonate (PC), or glass. In some embodiments of the invention, substrate 30 is generally rigid. Optionally, substrate 30 is generated by injection molding. Surface-relief diffractive structure 40 is optionally etched on substrate 30. Alternatively, diffractive structure 40 is created in the molding of substrate 30.

In some embodiments of the invention, substrate 30 has a rectangular box shape defined between a pair of mutually-opposing planar surfaces, having a long dimension in the direction of propagation of light beam 34. The width and thickness of substrate 30 are optionally substantially shorter than the length of the long dimension, optionally being at least 10 times or even 20 times shorter. In other embodiments, in order to keep pattern projector 18 compact, the length of substrate 30 is not substantially longer than its width, for example not more than four times or even not more than twice the width.

In the embodiment of FIG. 2, light beam 34 enters substrate 30 through an edge transverse to the long dimension and exits the substrate through diffractive structure 40 which is optionally located on one of the mutually-opposing planar surfaces which are the largest surfaces (facets) of substrate 30. The mutually-opposing planar surfaces are optionally parallel to each other, although also non-parallel opposing surfaces which still allow total internal reflection may be used.

Substrate 30 may be constructed, for example, in accordance with the general teachings of the above mentioned paper: "Total internal reflection diffraction grating in conical mounting", L. Eisen et. al., Optical Communications 261, pages 13-18 (2006), with adaptations required and/or advantageous for the use of substrate 30 for pattern projection, as discussed in the present application.

In some embodiments of the invention, light source 32 and substrate 30 are separately affixed to a housing of system 20. Alternatively, in order to increase the accuracy of their alignment, both substrate 30 and light source 32 are mounted on a substrate carrier 80. Light source 32 and/or substrate 30 may be mounted on carrier 80 directly over the bare die of the carrier or through an intermediate sub-mount, such as a sub-mount 90. Alternatively or additionally, any other suitable method for light source packaging (e.g., laser packaging) may be used.

In some embodiments of the invention, carrier 80 comprises a material having a low thermal expansion coefficient, such as glass and/or ceramic, so as to minimize the effect of temperature variations on the alignment of light source 32 relative to substrate 30. Optionally, light source and/or other elements of pattern projector 18 are also designed to have low thermal expansion properties.

Alternatively or additionally, carrier 80 comprises a material having thermal properties that compensate for thermal variations in coupling lens 36 and/or substrate 30. For example, carrier 80 may comprise a plastic with a thermal expansion coefficient selected according to the thermal expansion coefficient of lens 36, such that the distance between light source 32 and lens 36 changes in a manner which compensates for changes in the focal length of lens 36 due to temperature variations.

In some embodiments of the invention, the thermal properties of substrate 30 and/or of carrier 80 are selected to compensate for thermal variations in light source 32.

Optionally, carrier 80 and/or sub-mount 90 comprise a material with relatively high heat conduction, in order to aid in dissipation of the heat of light beam 34. Optionally, carrier 80 connects to a thermal dissipation body 92.

In some embodiments of the invention, electrical leads (not shown) to light source 32 pass through and/or on carrier 80. In some embodiments of the invention, the electrical leads connect to light source 32 by wire bonding.

Alternative Embodiments

Figure 3:
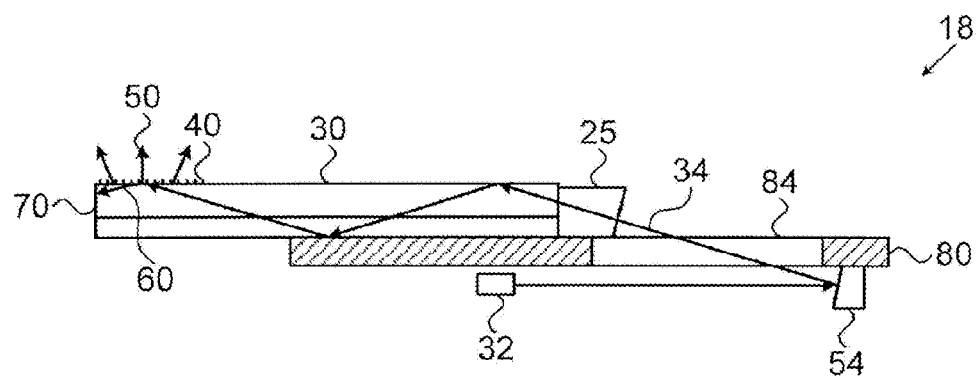
FIG. 3 is a schematic diagram of the elements of a pattern projector, in accordance with another embodiment of the invention.

FIG. 3 is a schematic diagram of the elements of pattern projector 18, in accordance with another embodiment of the invention. In the embodiment of FIG. 3, light source 32 is located on an opposite side of carrier 80, and light beam 34 passes through carrier 80 on its way from light source 32 to an edge 25 of substrate 30. Light source 32 may be mounted on courier 80 using any of the methods described above, including directly or through a sub-mount.

In some embodiments of the invention, the optical path between light source 32 and substrate edge 25 includes one or more optical elements, such as mirrors, which direct the light along the path. As shown, light source 32 is located beneath substrate 30 and is oriented such that light beam 34 is emitted from the light source substantially parallel to substrate 30. A mirror 54 located on the same side of carrier 80 as light source 32 optionally directs the light from light source 32 to substrate edge 25. Mirror 54 is optionally a concave off-axis collimating parabolic mirror oriented to direct light beam 34 through carrier 80 into edge 25 of substrate 30. Mirror 54 is optionally produced by injection molding of plastic or glass. In some embodiments of the invention, mirror 54 comprises a material having a low thermal expansion coefficient, such as a metal, or a material having thermal properties that compensate for thermal variations in carrier 80 and/or substrate 30.

The use of such a concave mirror may remove the need for using coupling lens 36 (FIG. 2) and hence reduces the cost of system 20. It is noted, however, that the arrangement of FIG. 3 may be used also with a planar mirror and a coupling lens at substrate edge 25.

In some embodiments of the invention, substrate edge 25 is tilted to achieve a desired incidence angle of light beam 34 with the surface of substrate edge 25. For example, the tilt of substrate edge 25 may be selected such that light beam 34 is perpendicular to the surface of edge 25 upon entrance to the substrate, so that light beam 34 is not deflected upon entrance into substrate 30. In other embodiments, substrate edge 25 is not tilted, for simplicity of production. The length of substrate 30 is selected according to the angle of the surface of edge 25 and the corresponding incidence angle of light beam 34 on the surface, such that light beam 34 is properly propagated through substrate 30 to surface-relief diffractive structure 40.

Carrier 80 is optionally opaque to reduce its cost, with a transparent window 84 allowing light beam 34 to pass therethrough. Alternatively, carrier 80 may be mostly or entirely transparent.

Instead of using mirror 54, light source 32 may be positioned across from edge 25, tilted so that light beam 34 is directed into substrate 30.

Alternatively to light beam 34 entering substrate 30 through coupling lens 36 on an edge of the substrate, beam 34 may be directed into substrate 30 through a surface-relief diffractive structure, as is now discussed with reference to FIG. 4.

Figure 4:
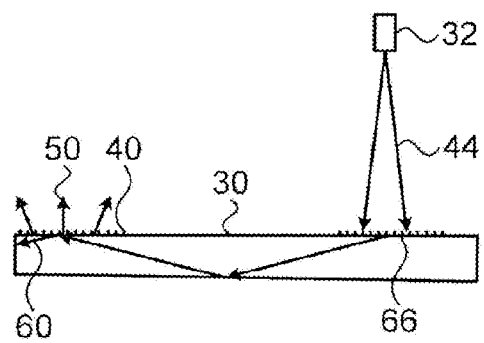
FIG. 4 is a schematic diagram of the elements of a pattern projector, in accordance with still another embodiment of the invention.

FIG. 4 is a schematic diagram of the elements of pattern projector 18, in accordance with still another embodiment of the invention. In the embodiment of FIG. 4, light source 32 generates a diverging light beam 44 which is directed to enter substrate 30 through an input diffractive structure 66 located on one of the wide surfaces of substrate 30. As shown, input diffractive structure 66 is located on the same surface as surface-relief diffractive structure 40 through which the light is emitted. In other embodiments, input diffractive structure 66 is located on the surface opposite surface-relief diffractive structure 40.

In these embodiments, light beam 44 optionally has a low spectral bandwidth, and input diffractive structure 66 is designed to couple the light into substrate 30 such that the light propagates along substrate 30 and reaches surface-relief diffractive structure 40 at a suitable angle for being directed toward object 26.

Input diffractive structure 66 is designed to deflect beam 44 sufficiently so that it propagates by TIR through substrate 30. In some embodiments of the invention, light beam from light source 32 is substantially perpendicular to substrate 30 and input diffractive structure 66. Alternatively, light source 32 is positioned such that light beam 44 meets input diffractive structure 66 at an angle (e.g., less than 75° or even less than 60°), such that the angle deflection of beam 44 required from input diffractive structure 66 is smaller, thus easing the manufacture requirements and costs of input diffractive structure 66.

Optionally, input diffractive structure 66 is designed to achieve a relatively high collimation quality, for example using any of the methods described in "Diffractive Optics, Design, Fabrication And Test", O'Shea et al., SPIE press, 2004, the disclosure of which is incorporated herein by reference. The properties of input diffractive structure 66 are optionally selected according to the desired diffraction of light beam 44 into substrate 30, which in turn is a function of the type of light source 32 (e.g., single mode or multimode laser) and its laser cavity properties. Optionally, in this embodiment, light source 32 is designed with high temperature stabilization of its wavelength, for example using a DFB laser.

Using input diffractive structure 66 may reduce the manufacturing cost of system 20, by removing the need of a collimation lens and/or reducing assembly costs, in that the optics of pattern projector 18 are all included in a single unit, i.e., substrate 30.

Alternatively to using input diffractive structure 66, a collimating lens and a separate diffractive prism are used to collimate the light beam and tilt it in a desired angle so that it propagates with TIR through the large surface of substrate 30.

Figure 5:
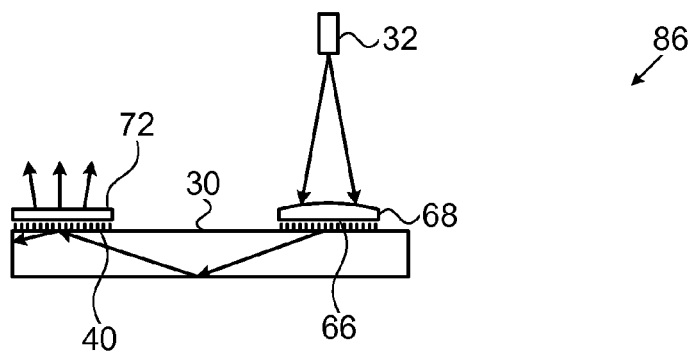
FIG. 5 is a schematic diagram of the elements of a pattern projector including a diffractive optical element (DOE), in accordance with an embodiment of the invention.

FIG. 5 is a schematic diagram of the elements of a pattern projector 86, which may be used in system 20 of FIG. 1, instead of projector 18, in accordance with still another embodiment of the invention. In the embodiment of FIG. 5, input diffractive structure 66 is used together with a collimating lens 68. The collimating lens 68 performs some or all of the required collimation, and input diffractive structure 66 performs any required remaining collimation and the beam tilting. Thus, in some cases, input diffractive structure 66 may be a simple grating. In still other embodiments, input diffractive structure 66 is used together with a tilting prism, possibly in addition to collimating lens 68.

FIG. 5 further illustrates the use of a diffractive optical element (DOE) 72 which, together with diffractive structure 40, directs the light exiting substrate 30 to aperture 29. For example, diffractive structure 40 may be a simple grating. DOE 72 may be used in order to improve the quality of the projected light pattern and/or to reduce manufacturing complexity and/or cost of substrate 30. For example, use of DOE 72 may allow using a simpler diffractive structure 40, for example having a relatively large period, which eases the manufacturing of diffractive structure 40, improves the manufacturing yield and reduces the device cost. Alternatively or additionally, DOE 72 may achieve a highly accurate light beam, which is more accurate than can be achieved using only diffractive structure 40. Diffractive surface 40 on substrate 30 may generate the pattern, with DOE 72 duplicating the pattern, or diffractive structure 40 may simply emit the light beam from structure 30, leaving the entire generation of the pattern to DOE 72.

In some embodiments of the invention, DOE 72 comprises a double-sided diffractive element having diffractive structures on both its faces, for example as described in US patent application publication 2009/0185274 to Shpunt, the disclosure of which is incorporated herein by reference in its entirety.

Other optical elements may alternatively or additionally be employed along the light path of pattern projector 86. For example, the light coming out through diffractive structure 40 may be passed through a prism and/or a plurality of prisms to direct it towards object 26.

Figure 6:
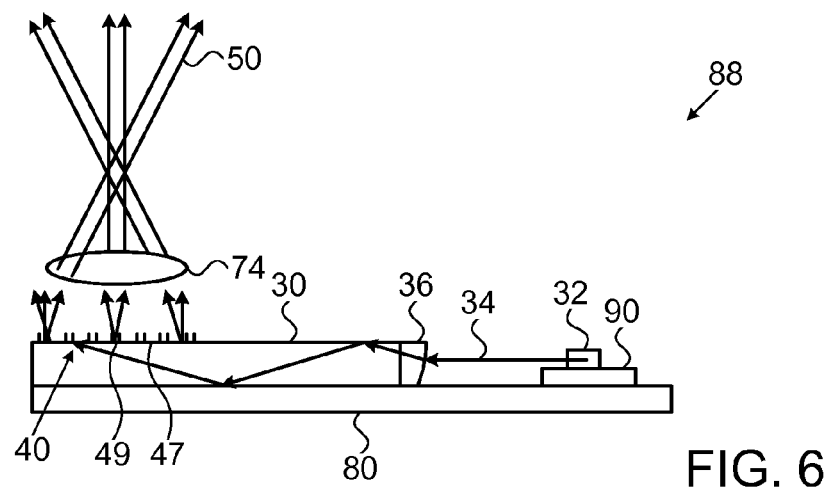
FIG. 6 is a schematic diagram of the elements of a pattern projector including a projection lens, in accordance with an embodiment of the invention.

FIG. 6 is a schematic illustration of a pattern projector 88, which may be used in system 20 of FIG. 1, instead of projector 18, in accordance with still another embodiment of the invention. In the embodiment of FIG. 6, a projection lens 74 is used to direct a light beam exiting substrate 30 through diffractive structure 40 towards object 26.

In some embodiments using lens 74, diffractive structure is non-continuous, including plain areas 47 and pattern areas 49. The resultant output beam 50, when projected by lens 74, generates a target pattern including a mixture of bright areas from pattern areas 49 and dark areas resulting from plain areas 47, as light reaching the surface of substrate 30 at areas 47 is returned inward by total internal reflection. Thus, a complex pattern image is achieved in an efficient manner, as the light impinging on plain areas 47 is not absorbed and wasted as in other pattern generation methods.

Figure 8:
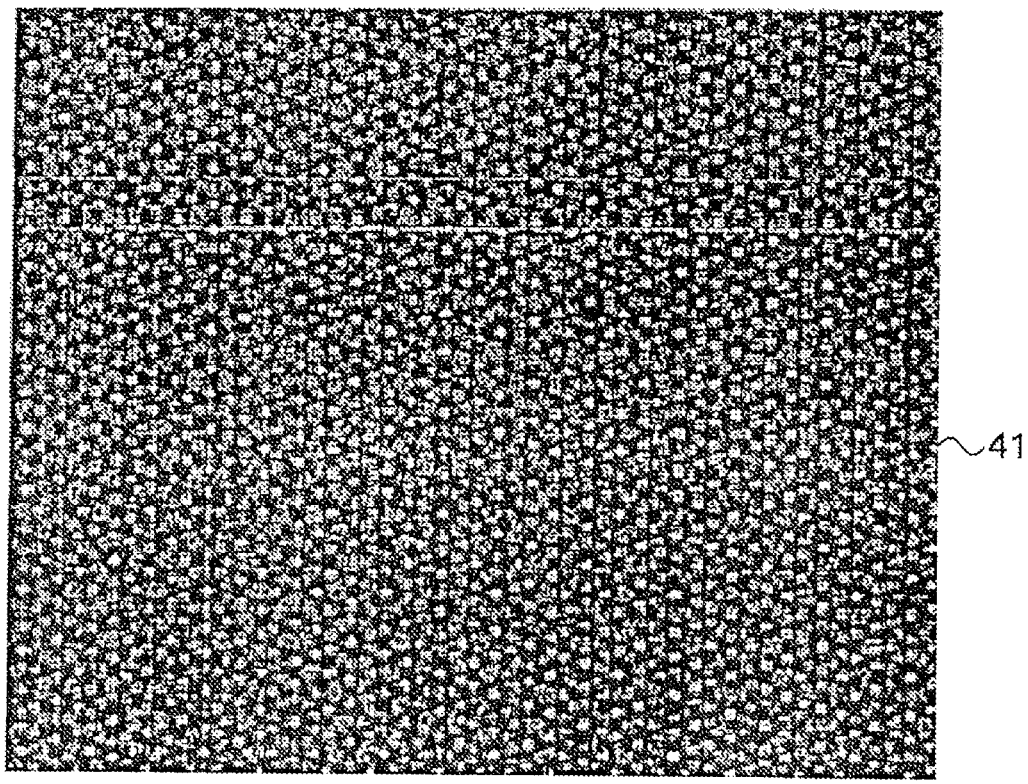
FIG. 8 is a schematic representation of a quasi-random distribution of light spots.

In some embodiments, the projected pattern generated by diffractive structure 40, in accordance with any of the above described embodiments, is shaped as a quasi-random distribution 41 of light spots with dark areas in between, as shown in FIG. 8 and described, for example, in the above-mentioned U.S. patent application publication 2008/0240502. In other embodiments, the pattern projected by diffractive structure 40 onto object 26 is fully random. In still other embodiments, a non-random uncorrelated pattern is generated by diffractive structure 40.

Optionally, the angular divergence of the light emitted from diffractive structure 40 matches aperture 29 and/or projection lens 74, such that all or most of the light coming out of substrate 30 will be projected over object 26. For example, the angular divergence of the light exiting diffractive structure 40 may match the F-number of lens 74.

The light used in this embodiment may be injected into substrate 30 using any of the methods described above. It is noted, however, that the use of projection lens 74 relieves some of the constraints on light beam 34, in that the collimation of beam 34 is required only for proper propagation of beam 34 in substrate 30 and less for output pattern accuracy. For example, in the embodiment of FIG. 6, light source 32 may comprise a laser having a large exit aperture, such as a multimode laser, regardless of the method used to direct the light into substrate 30. Alternatively or additionally, coupling lens 36 may have a relatively short focal length, for example less than 3 millimeters. Alternatively, the light for the embodiment of FIG. 6 may be directed into substrate 30 through an input diffractive structure 66, as in the embodiment of FIG. 5. Due to the use of projection lens 74, light source 32 may have a relatively large bandwidth, for example more than 10 nm (10 nanometers) or even more than 100 nm.

Spherical Embodiments

Figure 7:
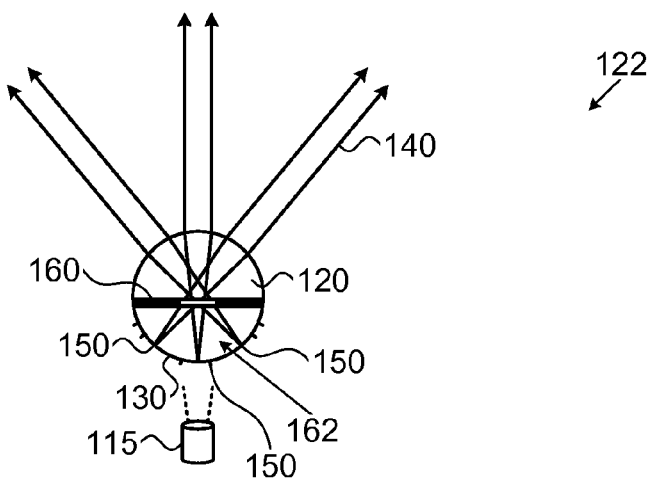
FIG. 7 is a schematic illustration of a spherical imaging device, in accordance with another embodiment of the invention.

FIG. 7 is a schematic illustration of a spherical imaging device 122, in accordance with another embodiment of the invention. Imaging device 122 comprises a projection lens 120 having a hemispherical shape and an object surface 130 having a hemispherical shape, placed adjacent each other such that the centers of their curvatures are at the same point.

Optionally, object surface 130 is formed of opaque areas and transparent areas, which together define a desired image. In some embodiments, object surface 130 is formed of an opaque layer with small transparent holes 150, which are used to generate a spot pattern. The opaque surface optionally comprises a light-absorbent surface and/or a highly reflective surface, which prevents light from entering device 122 except through transparent holes 150.

Transparent holes 150 may be flush with surface 130, or they may include microlenses. The microlenses optionally have a focal length smaller than 100 microns or even smaller than microns. The microlenses optionally comprise a polymer attached to surface 130, for example by injection molding using a master mold adapted to receive object surface 130 from one side and defining the locations of the microlenses on the other side.

Light from a light source 115 is converged and passed through object surface 130 and is then collimated by projection lens 120, forming a pattern beam 140. The use of spherical object surface 130 provides a relatively uniform quality throughout the generated light beam.

In some embodiments of the invention, an opaque surface 160, having an aperture 162 in its center, is placed between projection lens 120 and object surface 130. The size of aperture 162 is selected so as to limit the optical field of beam 140 and improve the angular resolution of the image provided by the beam. Opaque surface 160 limits an effective aperture of side beams coming from the edges of object surface 130. Aperture 162 is optionally not too small, so that the limitation on the effective aperture of the side beams does not substantially degrade the uniformity of the light beam. Optionally, aperture 162 is of the size of at least 15%, at least 25% or even at least 50% of the radius of lens 120. Alternatively or additionally, aperture 162 is smaller than 60% or even smaller than 40% of the radius of lens 120.

As shown, projection lens 120 and object surface 130 have the same radius, such that they together form a complete sphere. In other embodiments, projection lens 120 and object surface 130 have different radii. For example, object surface 130 may have a radius 20% or even 30% smaller than the radius of projection lens 120.

The index of refraction of lens 120 is optionally selected to match the ratio between the radii of projection lens 120 and object surface 130 in a manner that enhances the focus of beam 140. In an example embodiment, an index of refraction of 2 is used for equal radii of refraction of lens 120 and spherical object surface 130. Lens 120 and/or object surface 130 are optionally formed of glass, which can provide a sufficiently high refractive index.

Alternatively to lens 120 and/or object surface 130 being completely spherical, lens 120 and/or object surface 130 may be quasi-spheric, being close to spherical but not completely spherical. Optionally, the quasi-spheric shape of lens 120 and/or object surface 130 differs by at most 10% or even not more than 5% from a spherical shape, although quasi-spheric shapes differing by a larger extent from a sphere, may be used in some embodiments. A quasi-spheric shape is optionally used to compensate for distortions added by opaque surface 160 and/or to better collimate or focus beam 140.

Light source 115 is optionally directed to substantially uniformly illuminate object surface 130, with the center of the light beam directed towards aperture 162. It is noted, however, that the design of imaging device 122 is relatively robust, and a large range of light sources 115 may be used. In some embodiments, light source 115 comprises a near infrared (NIR) laser and a condenser lens, which converges the light of the laser toward aperture 162. The condenser lens may be a single-piece lens or may comprise a more complex optical system including several optical elements. The condenser lens includes in some embodiments one or more Fresnel lenses.

Alternatively or additionally, light source 115 comprises a TIR substrate which receives light from an entrance point on one of its surfaces or its side and emits the light through a diffraction pattern directed toward aperture 162. The TIR substrate may be designed, for example, in accordance with any of the embodiments described above with reference to FIGS. 2-6 and/or combinations thereof, adapted to the fact that the generated beam is not required to carry a pattern. Optionally, the diffractive structure used to direct the light towards spherical object surface 130 comprises a modulated combination of a high-frequency grating and a diffractive positive lens, which directs the light from the TIR substrate to surface 130.

CONCLUSION

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A pattern projector, comprising:
a light source, which is configured to emit a beam of light;
a transparent substrate, which has a pair of mutually-opposed planar surfaces and is configured to receive and propagate the beam within the substrate by total internal reflection between the planar surfaces and which comprises a diffractive structure that is formed on one of the planar surfaces and is configured to direct at least a part of the beam to propagate out of the substrate in a direction that is angled away from the surface and to create a pattern comprising multiple interleaved light and dark areas; and
at least one diffractive element through which light exiting the substrate through the diffractive structure passes on its way to a target,
wherein the at least one diffractive element is configured to duplicate the pattern that is created by the diffractive structure formed on the one of the planar surfaces.

2. The projector of claim 1, wherein the diffractive structure comprises both diffractive sub-areas and non-diffractive sub-areas arranged to define a projected pattern in the light exiting the substrate.

3. The projector of claim 1, wherein the diffractive structure on one of the planar surfaces creates a diffraction pattern comprising multiple interleaved light and dark areas in far-field.

4. The pattern projector of claim 1, wherein the pattern comprises a quasi-random distribution of light spots.

5. A method of pattern projection, comprising:
directing a light beam into a transparent substrate through one of its greatest area surfaces;
propagating the light beam through the substrate by total internal reflection to a diffractive structure on the substrate; and
emitting at least a part of the light beam to propagate out of the substrate through the diffractive structure so as to project a pattern comprising multiple interleaved light and dark areas that is defined by the diffractive structure,
wherein emitting at least a part of the light beam comprises passing light exiting the substrate through at least one diffractive element on its way to a target, and wherein passing the light through at least one diffractive element comprises duplicating, by the at least one diffractive element, the pattern that is defined by the diffractive structure on the substrate.

6. The method of claim 5, wherein the diffractive structure includes diffractive areas and plain areas.

7. A three dimensional mapping system, comprising:
a light source which generates a light beam for illuminating an object;
a transparent substrate defining a diffractive structure thereon, the transparent substrate being configured to receive the light beam from the light source through one of its greatest area surfaces, and to direct the light beam within the substrate, by total internal reflection, to the diffractive structure which directs the light beam to propagate out of the substrate while projecting a pattern comprising multiple interleaved light and dark areas that is defined by the diffractive structure onto the object;
a light detector configured to collect light from the light source reflected from the object; and
a processor configured to process light collected by the light detector for three-dimensional mapping of the object, responsive to patterns of the light projected on the object from the diffractive structure.

8. The system of claim 7, wherein the diffractive structure comprises both diffractive sub-areas and non-diffractive sub-areas arranged to define an image in the light beam exiting the substrate through the diffractive structure.

9. The system of claim 7, wherein the diffractive structure is designed to project a quasi-random distribution of light spots.

10. The system of claim 7, wherein an edge of the transparent substrate is treated to prevent reflection of light received from the diffractive structure from returning to the diffractive structure.

11. The system of claim 7, comprising a diffractive element through which the light emitted from the diffractive structure defined on the transparent substrate passes on its way to the object.

12. The system of claim 11, wherein the diffractive element is configured to duplicate the pattern that is created by the diffractive structure defined on the transparent substrate.

* * * * *